United States Patent
Chang (10) Patent No.: US 9,626,011 B2
(45) Date of Patent: Apr. 18, 2017

(54) RECHARGEABLE CAPACITIVE STYLUS

(71) Applicant: WALTOP INTERNATIONAL CORPORATION, Hsinchu (TW)

(72) Inventor: Yi Chih Chang, Taipei (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 110 days.

(21) Appl. No.: 14/815,067

(22) Filed: Jul. 31, 2015

(65) Prior Publication Data

US 2016/0320868 A1    Nov. 3, 2016

(30) Foreign Application Priority Data

May 1, 2015 (TW) .............................. 104206729 U (51) Int. Cl.
*G06F 3/0354* (2013.01)

(52) U.S. Cl.
CPC .............................. *G06F 3/03545* (2013.01)

(58) Field of Classification Search
CPC ...... G06F 3/0317; G06F 3/0321; G06F 3/033; G06F 3/0354; G06F 3/03542; G06F 3/03545; G06F 3/03546; G06F 3/0386
See application file for complete search history.

(56) References Cited

U.S. PATENT DOCUMENTS

| | | | | |
|---|---|---|---|---|
| 5,803,582 A | * | 9/1998 | Huang | G02B 27/20 362/109 |
| 6,932,276 B1 | * | 8/2005 | Liu | B43K 29/093 235/486 |
| 8,670,027 B1 | * | 3/2014 | Schaffer | H04N 1/00127 348/61 |
| 9,025,318 B2 | * | 5/2015 | Ashcraft | G06F 1/26 361/679.01 |
| 9,377,878 B2 | * | 6/2016 | Peralta | G06F 3/03545 |
| 2007/0176909 A1 | * | 8/2007 | Pavlowski | G06F 3/03545 345/179 |
| 2012/0224358 A1 | * | 9/2012 | Noble | F21L 4/027 362/158 |
| 2013/0343042 A1 | * | 12/2013 | Windom | F21L 4/08 362/183 |

(Continued)

Primary Examiner — Gene W Lee
(74) Attorney, Agent, or Firm — Li & Cai Intellectual Property (USA) Office (57) ABSTRACT

A rechargeable capacitive stylus includes a pen-shaped casing structure, a sensor module, a pen head structure, and an electrical connector structure. The pen-shaped casing structure has a pen casing, a rotatable ring rotatably disposed around the pen casing, and a pen holder adjacent to the rotatable ring. The sensor module is disposed inside the pen-shaped casing structure. The pen head structure is movably disposed inside the pen-shaped casing structure to selectively contact the sensor module. The electrical connector structure is disposed inside the pen-shaped casing structure. The electrical connector structure includes a first electrical connector electrically connected to a power supply, and the first electrical connector has a first electrical connection portion. The pen casing has a first fixed opening for exposing the first electrical connection portion, and the rotatable ring has a movable opening that is moved relative to the pen casing or the pen holder.

15 Claims, 12 Drawing Sheets

(56) References Cited

U.S. PATENT DOCUMENTS

| | | | |
|---|---|---|---|
| 2014/0015812 A1* | 1/2014 | Peralta | G06F 3/03545 345/179 |
| 2014/0029182 A1* | 1/2014 | Ashcraft | G06F 1/26 361/679.4 |
| 2015/0003050 A1* | 1/2015 | Parsons | H05B 33/0806 362/158 |

* cited by examiner

RECHARGEABLE CAPACITIVE STYLUS

BACKGROUND OF THE INVENTION

1. Field of the Invention

The instant disclosure relates to a stylus, and more particularly to a rechargeable capacitive stylus.

2. Description of Related Art

Conventional touch control devices may be classified into three types: resistive, electromagnetic and capacitive. Operation with a resistive touch control device requires a rigid pen tip to apply a significant force on the resistive touch control device in a very small area to accomplish deformation of the resistive touch sensor, and an electromagnetic touch control device requires a special battery powered pen for input; while the working principle of a capacitive touch control device relies on capacitive coupling, which takes place as soon as the capacitive touch sensor is touched by a conductive object, and the touch position can then be identified according to the variation in capacitance at the touch point. Therefore, a capacitive touch control device does not require an input pen that consumes electricity. Nor is it necessary to subject a capacitive touch sensor to concentrated pressure application for deformation, and thus a capacitive touch control device has a longer service life. Furthermore, mass production of capacitive touch control devices requires lower costs due to its simple construction, less components and higher yield rate.

A capacitive touch control device can be operated in many ways. The most common of all is using a conductor, for example a finger or a pen, to touch or slide on the surface of the capacitive touch control device, for the capacitive touch sensor thereof to generate a response signal. However, as capacitive touch control devices find more and more applications, the lower precision on position detection tends to hinder smoothness of operation where more precise and more efficient detection is required, such as in handheld devices. In order to enable enhanced precision on position detection, many people choose to use pens for capacitive touch input.

SUMMARY OF THE INVENTION

One aspect of the instant disclosure relates to a rechargeable capacitive stylus.

One of the embodiments of the instant disclosure provides a rechargeable capacitive stylus, comprising: a pen-shaped casing structure, a support structure, a circuit substrate, a sensor module, a pen head structure, an electrical connector structure, and a power supply component. The pen-shaped casing structure has a pen casing, a rotatable ring rotatably disposed around the pen casing, and a pen holder adjacent to the pen casing and the rotatable ring. The support structure is disposed inside the pen-shaped casing structure. The circuit substrate is positioned on the support structure and disposed inside the pen-shaped casing structure. The sensor module is positioned on the support structure and disposed inside the pen-shaped casing structure. The pen head structure is movably disposed on the support structure to selectively contact the sensor module, and the pen head structure has an exposed contact portion exposed from the pen-shaped casing structure. The electrical connector structure is positioned on the support structure and disposed inside the pen-shaped casing structure. The electrical connector structure includes a chargeable carrier substrate positioned on the support structure and a first electrical connector disposed on the chargeable carrier substrate and electrically connected to the chargeable carrier substrate, and the first electrical connector has a first electrical connection portion. The power supply component is disposed on the support structure and electrically connected between the circuit substrate and the electrical connector structure. More particularly, the pen casing has a first fixed opening for exposing the first electrical connection portion of the first electrical connector, and the rotatable ring has a movable opening that is moved relative to the pen casing or the pen holder.

Another one of the embodiments of the instant disclosure provides a rechargeable capacitive stylus, comprising: a pen-shaped casing structure, a sensor module, a pen head structure, and an electrical connector structure. The pen-shaped casing structure has a pen casing, a rotatable ring rotatably disposed around the pen casing, and a pen holder adjacent to the pen casing and the rotatable ring. The sensor module is disposed inside the pen-shaped casing structure. The pen head structure is movably disposed inside the pen-shaped casing structure to selectively contact the sensor module, and the pen head structure has an exposed contact portion exposed from the pen-shaped casing structure. The electrical connector structure is disposed inside the pen-shaped casing structure. The electrical connector structure includes a first electrical connector electrically connected to a power supply, and the first electrical connector has a first electrical connection portion. More particularly, the pen casing has a first fixed opening for exposing the first electrical connection portion of the first electrical connector, and the rotatable ring has a movable opening that is moved relative to the pen casing or the pen holder.

Furthermore, the electrical connector structure includes a second electrical connector disposed on the chargeable carrier substrate and electrically connected to the chargeable carrier substrate, and the second electrical connector has a second electrical connection portion corresponding to the first electrical connection portion, wherein the pen casing has a second fixed opening for exposing the second electrical connection portion of the second electrical connector.

More particularly, the rotatable ring is rotated relative to the pen casing or the pen holder to move the movable opening to a position under the pen holder, so that the first fixed opening and the second fixed opening of the pen casing is covered by the rotatable ring, and the movable opening of the rotatable ring is shaded by the pen holder.

More particularly, the rotatable ring is rotated clockwise relative to the pen casing or the pen holder to align the movable opening with the first fixed opening, so that the second fixed opening of the pen casing is covered by the rotatable ring, and the first electrical connection portion of the first electrical connector is exposed from the first fixed opening and the movable opening to electrically mate with an electrical connection head.

More particularly, the rotatable ring is rotated anti-clockwise relative to the pen casing or the pen holder to align the movable opening with the second fixed opening, so that the first fixed opening of the pen casing is covered by the rotatable ring, and the second electrical connection portion of the second electrical connector is exposed from the second fixed opening and the movable opening to electrically mate with an electrical connection head.

Therefore, when the rotatable ring is rotated relative to the pen casing or the pen holder to move the movable opening to a position under the pen holder, the first fixed opening of the pen casing is covered by the rotatable ring, and the movable opening of the rotatable ring is shaded by the pen holder to enhance the aspect of the rechargeable capacitive stylus. Furthermore, when the rotatable ring is rotated relative to the pen casing or the pen holder to align the movable opening with the first fixed opening, the first electrical connection portion of the first electrical connector is exposed from the first fixed opening and the movable opening to electrically mate with an electrical connection head, in order to charge up the power supply component of the rechargeable capacitive stylus.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "a rechargeable capacitive stylus (touch pen)" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 9, the instant disclosure provides a rechargeable capacitive stylus Z, comprising: a pen-shaped casing structure 1, a support structure 2, a circuit substrate 3, a sensor module 4, a pen head structure 5, an electrical connector structure 6, and a power supply component 7.

Figure 1:
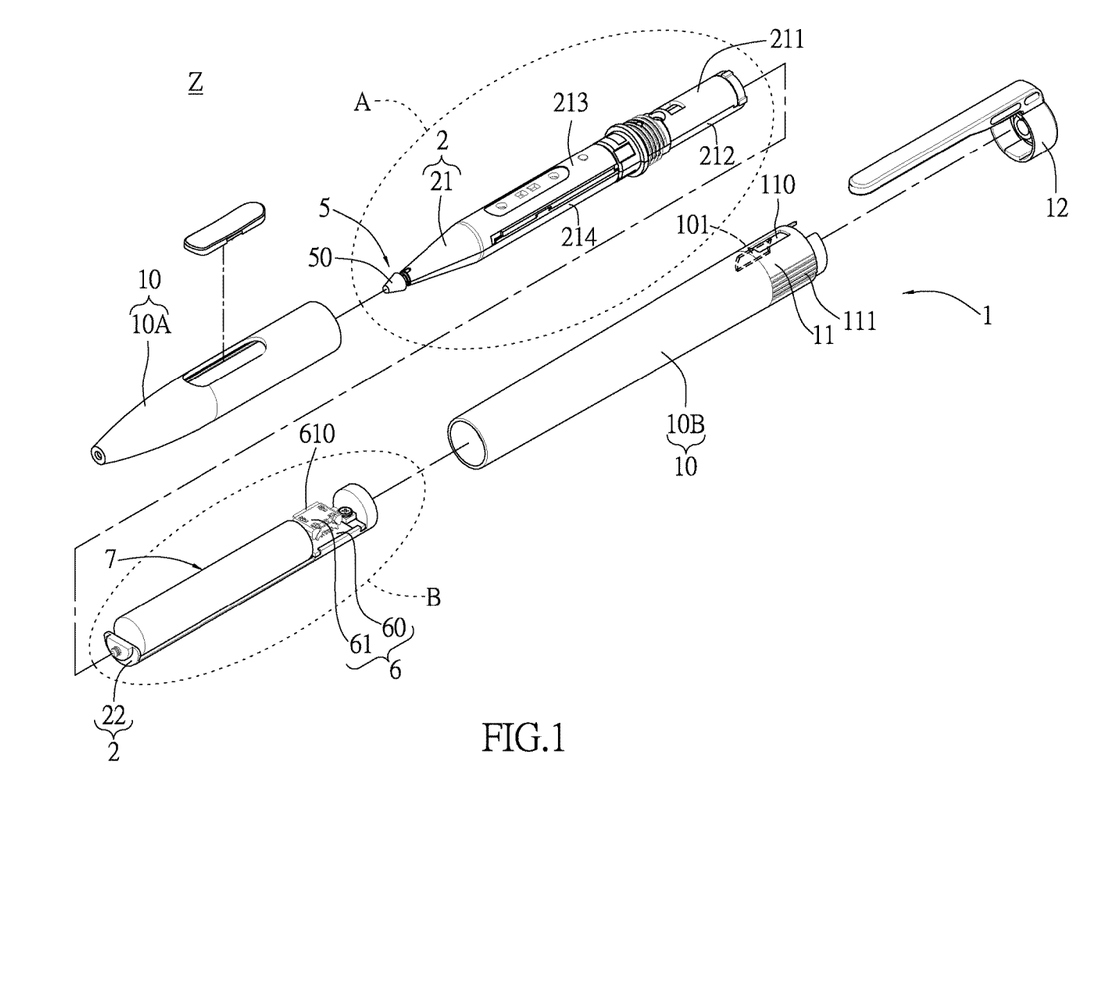
FIG. 1 shows a partial, perspective, exploded, schematic view of the rechargeable capacitive stylus according to the instant disclosure.
Figure 2:
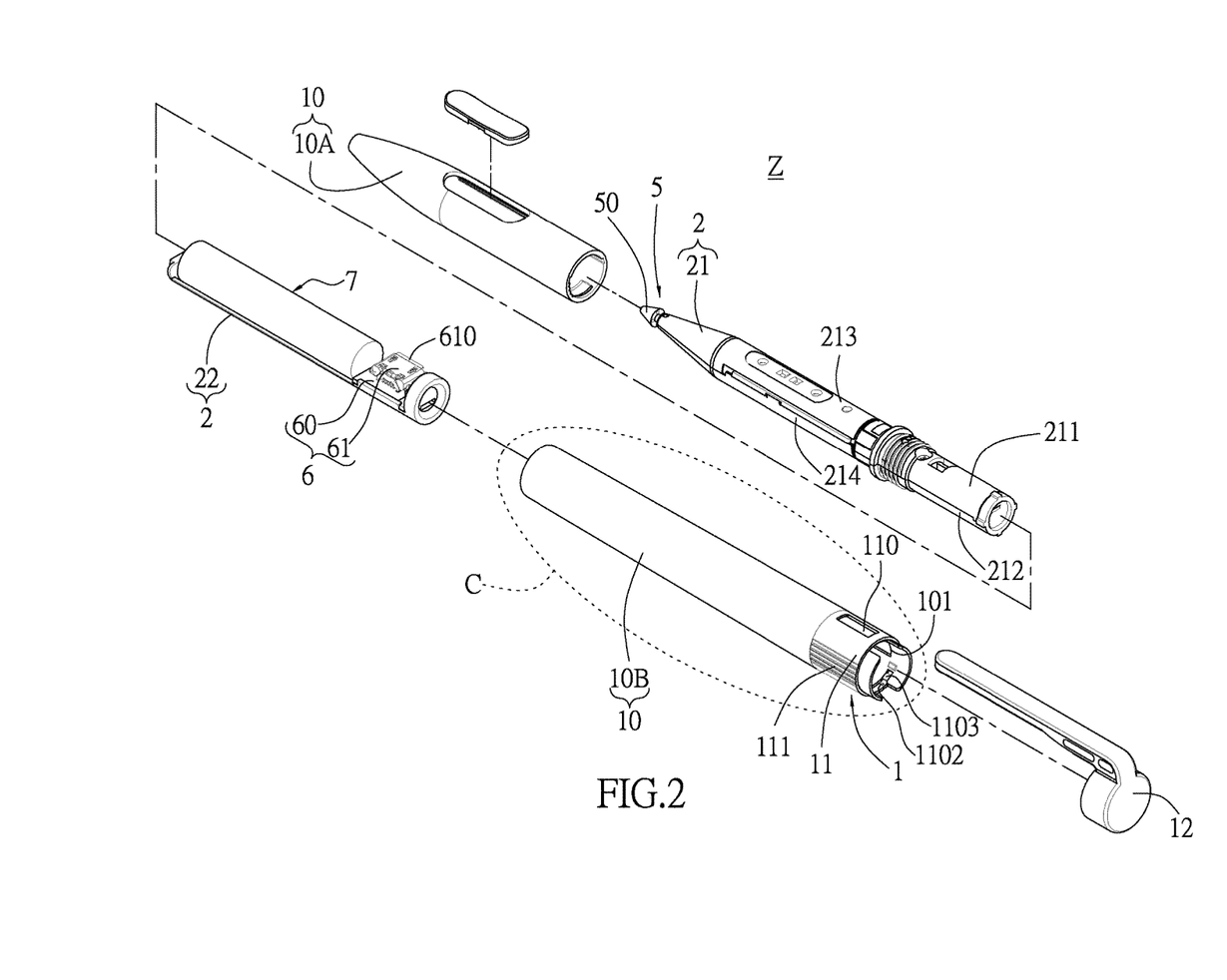
FIG. 2 shows another partial, perspective, exploded, schematic view of the rechargeable capacitive stylus according to the instant disclosure.

First, referring to FIG. 1 and FIG. 2, the pen-shaped casing structure 1 has a pen casing 10, a rotatable ring 11 (such as rotary collar) rotatably disposed around the pen casing 10, and a pen holder 12 (such as a pen clip) adjacent to the pen casing 10 and the rotatable ring 11. More particularly, the pen casing 10 is composed of a front pen casing portion 10A and a rear pen casing portion 10B connected to the front pen casing portion 10A, and the rotatable ring 11 is rotatably disposed around the rear pen casing portion 10B. In addition, the rotatable ring 11 has a non-slip portion 111 provided for user, and the pen holder 12 is fixedly disposed around the rear pen casing portion 10B directly.

Moreover, referring to FIG. 1 to FIG. 4, the support structure 2 is disposed inside the pen-shaped casing structure 1, and the circuit substrate 3 is positioned on the support structure 2 and disposed inside the pen-shaped casing structure 1. More particularly, the support structure 2 includes a first support element 21 for supporting the circuit substrate 3, the sensor module 4, and the pen head structure 5 and a second support element 22 connected to the first support element 21 for supporting the electrical connector structure 6 and the power supply component 7. In addition, the first support element 21 includes a first support body 211 (or called as a top lateral holder), a second support body 212 (or called as a bottom lateral holder) connected to the first support body 211, a first conductive layer 213 (or called as a top lateral mask) disposed on the first support body 211, and a second conductive layer 214 (or called as a bottom lateral mask) connected to the first conductive layer 213 and disposed on the second support body 212, and one of the first conductive layer 213 and the second conductive layer 214 is electrically connected to a grounding soldering region 30 of the circuit substrate 3. For example, the second conductive layer 214 is electrically connected to the grounding soldering region 30 of the circuit substrate 3 through a grounding extending portion 2410.

Figure 3:
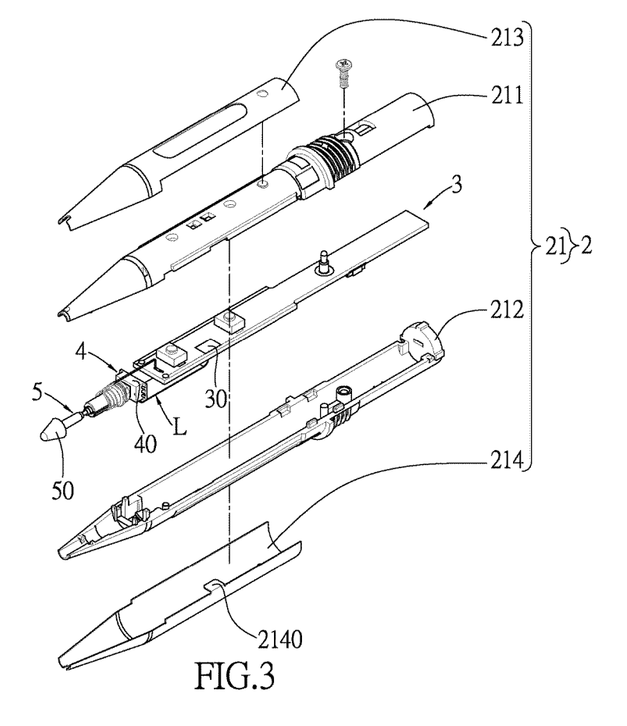
FIG. 3 shows a perspective, exploded, schematic view taken on part A of FIG. 1.

Furthermore, referring to FIG. 1 to FIG. 3, the sensor module 4 is positioned on the support structure 2 and disposed inside the pen-shaped casing structure 1, and the sensor module 4 is electrically connected to the circuit substrate 3. For example, the sensor module 4 has a sensor component 40 electrically connected to the circuit substrate 3 through a conductive wire L. In addition, the pen head structure 5 is movably disposed on the support structure 2 to selectively contact the sensor module 4, and the pen head structure 5 has an exposed contact portion 50 exposed from the pen-shaped casing structure 1. More particularly, the sensor component 40 of the sensor module 4 can be used to determine the degree of pressure when a user uses the rechargeable capacitive stylus Z. The sensor component 40 then shows lines on the handwritten board (not shown). The lines may have different thickness according to the degree of pressure.

Figure 4:
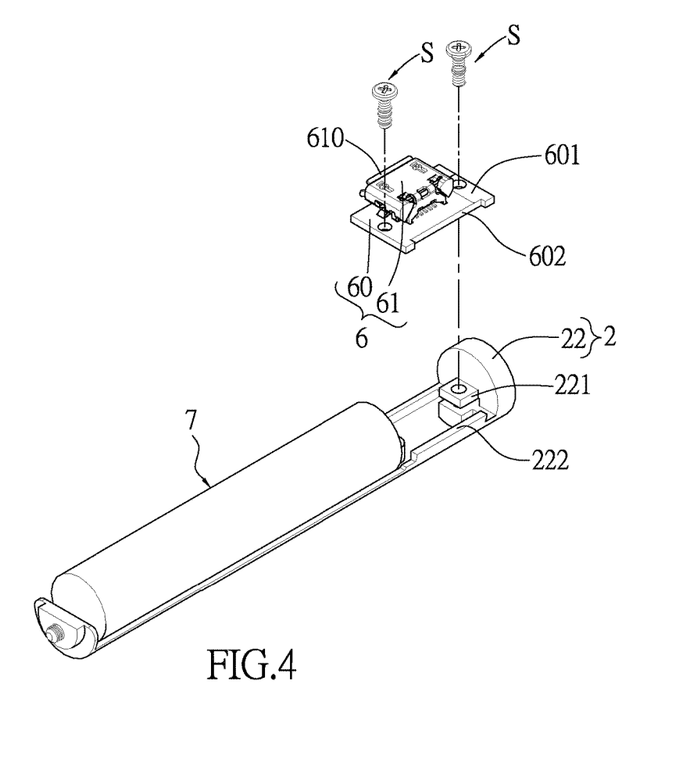
FIG. 4 shows a perspective, exploded, schematic view taken on part B of FIG. 1.

In addition, referring to FIG. 1, FIG. 2, and FIG. 4, the electrical connector structure 6 is positioned on the support structure 2 and disposed inside the pen-shaped casing structure 1, and the power supply component 7 (or an electrical storage component such as a rechargeable battery) is disposed on the support structure 2 and electrically connected between the circuit substrate 3 and the electrical connector structure 6. Therefore, an external power source can transmitted to the power supply component 7 through the electrical connector structure 6, so that the power supply component 7 can provide powers for the circuit substrate 3. Furthermore, the electrical connector structure 6 includes a chargeable carrier substrate 60 positioned on the support structure 2 and a first electrical connector 61 disposed on the chargeable carrier substrate 60 and electrically connected to the chargeable carrier substrate 60, and the first electrical connector 61 has a first electrical connection portion 610.

More particularly, referring to FIG. 1, FIG. 2, and FIG. 4, the second support element 22 has a first retaining portion 221 (or called as a fixed holder) and a second retaining portion 222 (or called as another fixed holder for retaining chargeable carrier substrate 60). In addition, the chargeable carrier substrate 60 has two adjacent lateral side portions (601, 602) respectively mated with the first retaining portion 221 and the second retaining portion 222, and the chargeable carrier substrate 60 is secured on the second support element 22 through many securing elements S (such as screws or bolts). Furthermore, referring to FIG. 1, FIG. 2, and FIG. 5, the rear pen casing portion 10B of the pen casing 10 has a first positioning groove 1001, a second positioning groove 1002, and a sliding track 1003 disposed between the first positioning groove 1001 and the second positioning groove 1002, and the rotatable ring 11 has a first positioning convex point 1101 corresponding to the first positioning groove 1001, a second positioning convex point 1102 corresponding to the second positioning groove 1002, and a movable sliding block 1103 corresponding to the sliding track 1003. It is worth noting that, the first positioning convex point 1101 can be selectively retained inside the first positioning groove 1001, the second positioning convex point 1102 can be selectively retained inside the second positioning groove 1002, and the movable sliding block 1103 can be slidably disposed inside the sliding track 1003.

Figure 5:
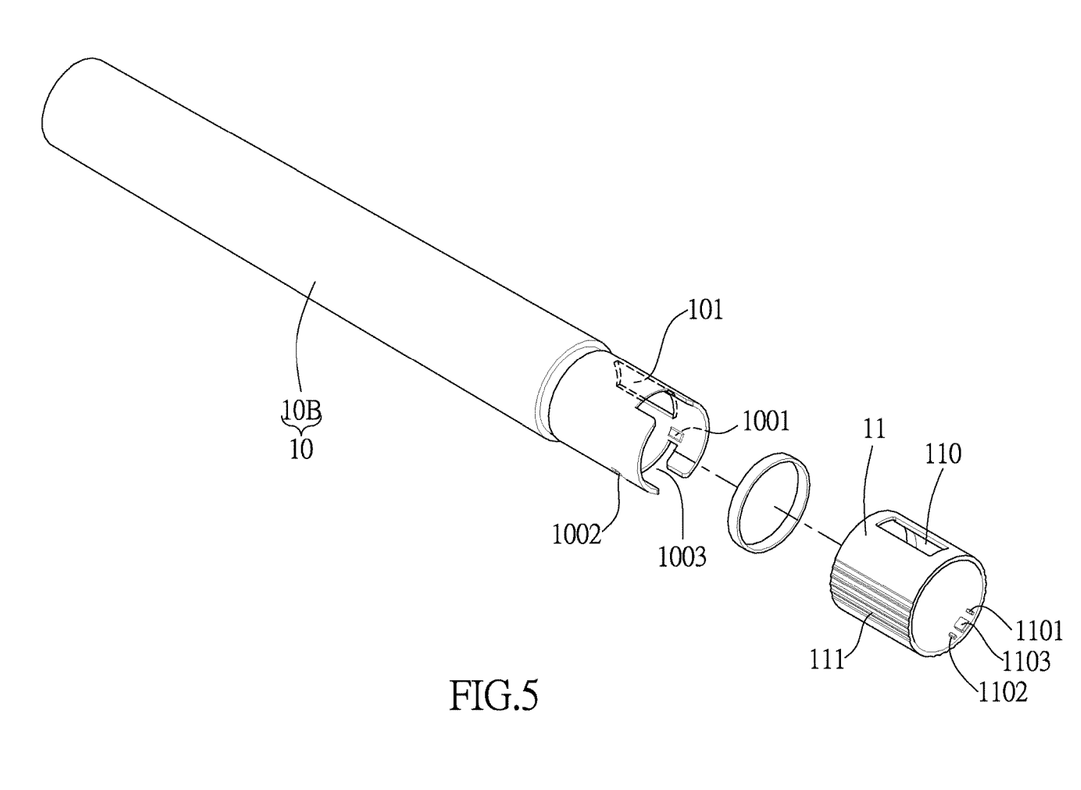
FIG. 5 shows a perspective, exploded, schematic view taken on part C of FIG. 2.

Please note, referring to FIG. 1, FIG. 2, and FIG. 5, the pen casing 10 has a first fixed opening 101 for exposing the first electrical connection portion 610 of the first electrical connector 61, and the rotatable ring 11 has a movable opening 110 that is moved relative to the pen casing 10 or the pen holder 12.

Figure 6:
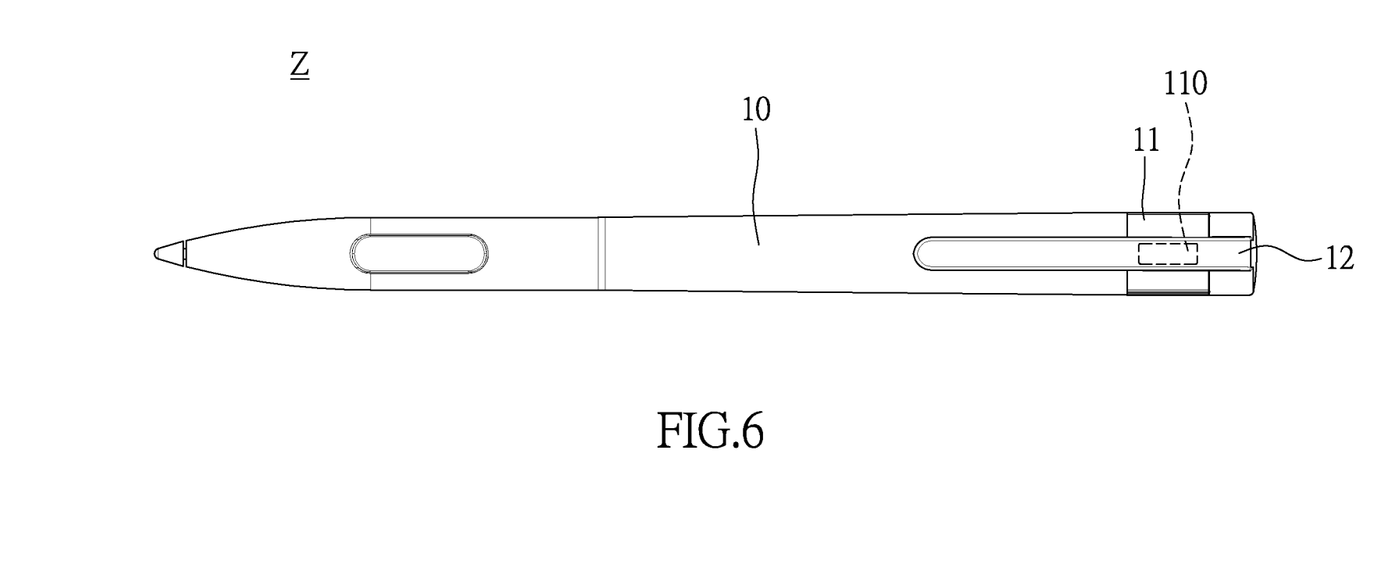
FIG. 6 shows a top, assembled, schematic view of the rechargeable capacitive stylus according to the instant disclosure.
Figure 7:
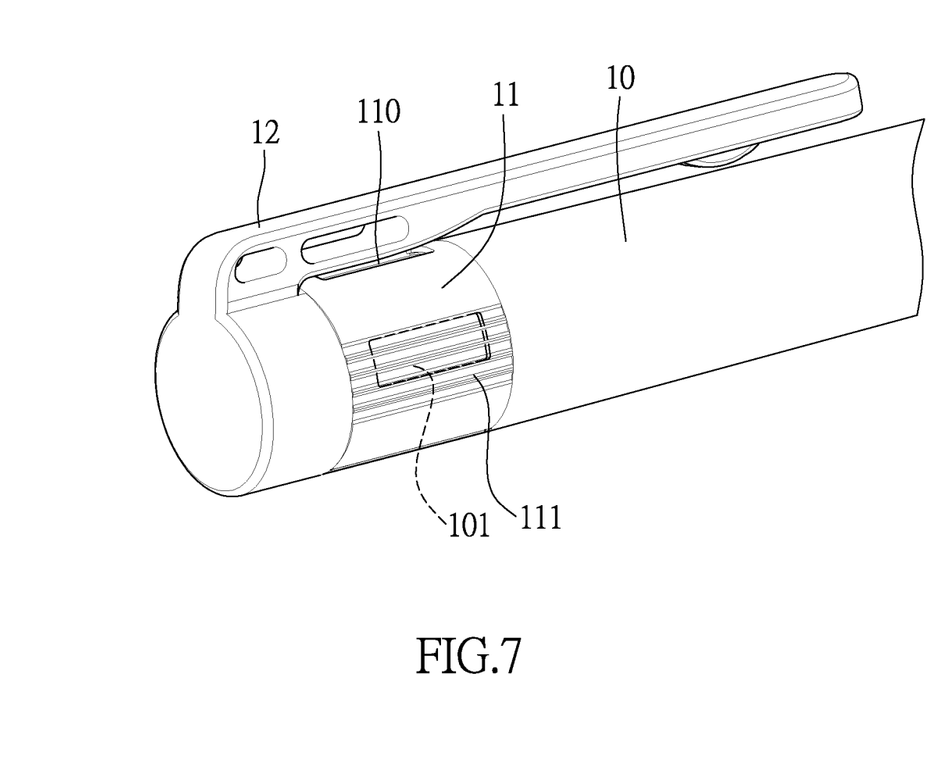
FIG. 7 shows a partial, perspective, schematic view of covering the first fixed opening by the rotatable ring and shading the movable opening by the pen holder according to the instant disclosure.

For example, referring to FIG. 5 to FIG. 7, when the rotatable ring 11 is rotated relative to the pen casing 10 or the pen holder 12 to move the movable opening 110 to a position under the pen holder 12 (as shown in FIG. 6 or FIG. 7), the first fixed opening 101 of the pen casing 10 is covered by the rotatable ring 11, and the movable opening 110 of the rotatable ring 11 is shaded by the pen holder 12 to enhance the aspect of the rechargeable capacitive stylus Z.

Figure 8:
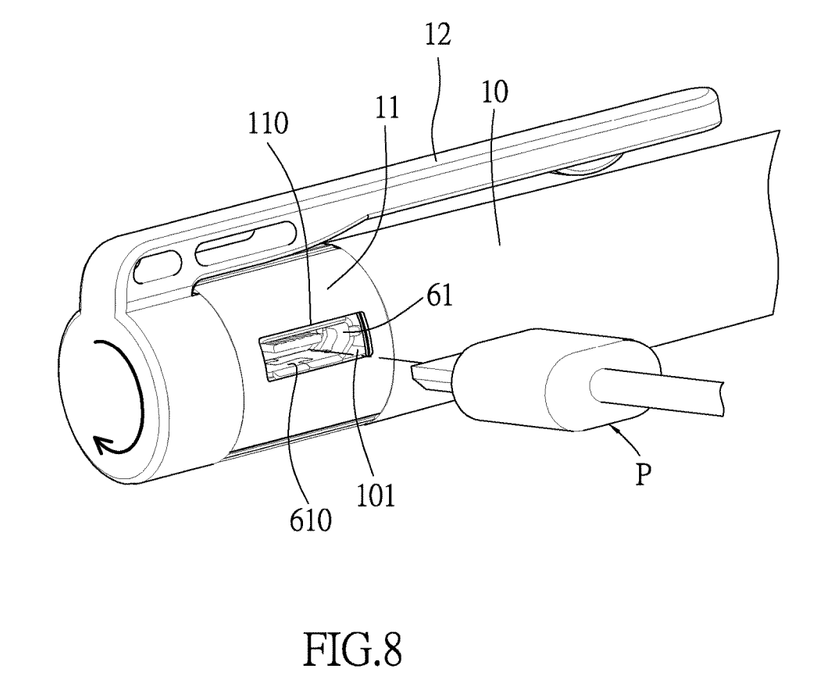
FIG. 8 shows a partial, perspective, schematic view of exposing the first electrical connection portion from the first fixed opening and the movable opening for preparing to electrically mate with an electrical connection head according to the instant disclosure.
Figure 9:
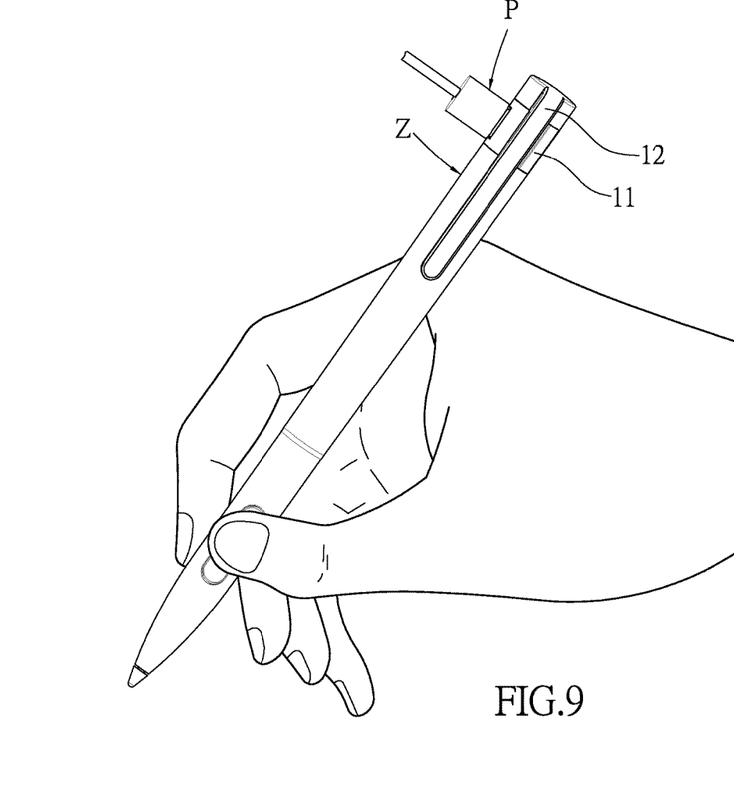
FIG. 9 shows a partial, perspective, schematic view of exposing the first electrical connection portion from the first fixed opening and the movable opening to electrically mate with an electrical connection head according to the instant disclosure.

For example, referring to FIG. 5 to FIG. 9, when the rotatable ring 11 is rotated relative to the pen casing 10 or the pen holder 12 to align the movable opening 110 with the first fixed opening 101 (as shown in FIG. 8), the first electrical connection portion 610 of the first electrical connector 61 (such as a female connector) is exposed from the first fixed opening 101 and the movable opening 110 to electrically mate with an electrical connection head P (such as a male connector), in order to charge up the power supply component 7 of the rechargeable capacitive stylus Z. As shown in FIG. 9, the rechargeable capacitive stylus Z can be used by a right handedness during the charging process.

Please note, referring to FIG. 7, and FIG. 10 to FIG. 12, the electrical connector structure 6 includes a second electrical connector 62 disposed on the chargeable carrier substrate 60 and electrically connected to the chargeable carrier substrate 60, and the second electrical connector 62 has a second electrical connection portion 620 corresponding to the first electrical connection portion 610. In addition, the pen casing 10 has a second fixed opening 102 for exposing the second electrical connection portion 620 of the second electrical connector 62.

Figure 10:
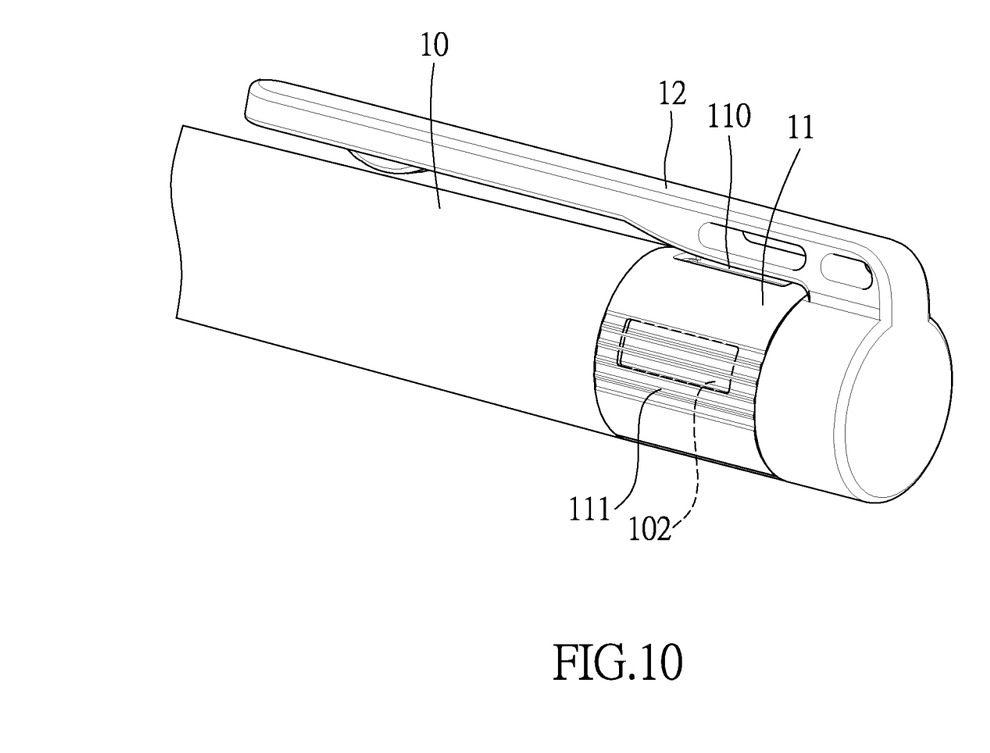
FIG. 10 shows a partial, perspective, schematic view of covering the first fixed opening and the second fixed opening by the rotatable ring and shading the movable opening by the pen holder according to the instant disclosure.

For example, referring to FIG. 6, FIG. 7, and FIG. 10, when the rotatable ring 11 is rotated relative to the pen casing 10 or the pen holder 12 to move the movable opening 110 to a position under the pen holder 12 (as shown in FIG. 10), the first fixed opening 101 (as shown in FIG. 7) and the second fixed opening 102 (as shown in FIG. 10) of the pen casing 10 is covered by the rotatable ring 11, and the movable opening 110 of the rotatable ring 11 is shaded by the pen holder 12 to enhance the aspect of the rechargeable capacitive stylus Z.

For example, referring to FIG. 8, FIG. 9, and FIG. 10, when the rotatable ring 11 is rotated clockwise relative to the pen casing 10 or the pen holder 12 to align the movable opening 110 with the first fixed opening 101 (as shown in FIG. 8), the second fixed opening 102 of the pen casing 10 is covered by the rotatable ring 11 (as shown in FIG. 10), and the first electrical connection portion 610 of the first electrical connector 61 (such as a female connector) is exposed from the first fixed opening 101 and the movable opening 110 to electrically mate with an electrical connection head P (such as a male connector), in order to charge up the power supply component 7 of the rechargeable capacitive stylus Z. As shown in FIG. 9, the rechargeable capacitive stylus Z can be used by a right handedness during the charging process.

Figure 11:
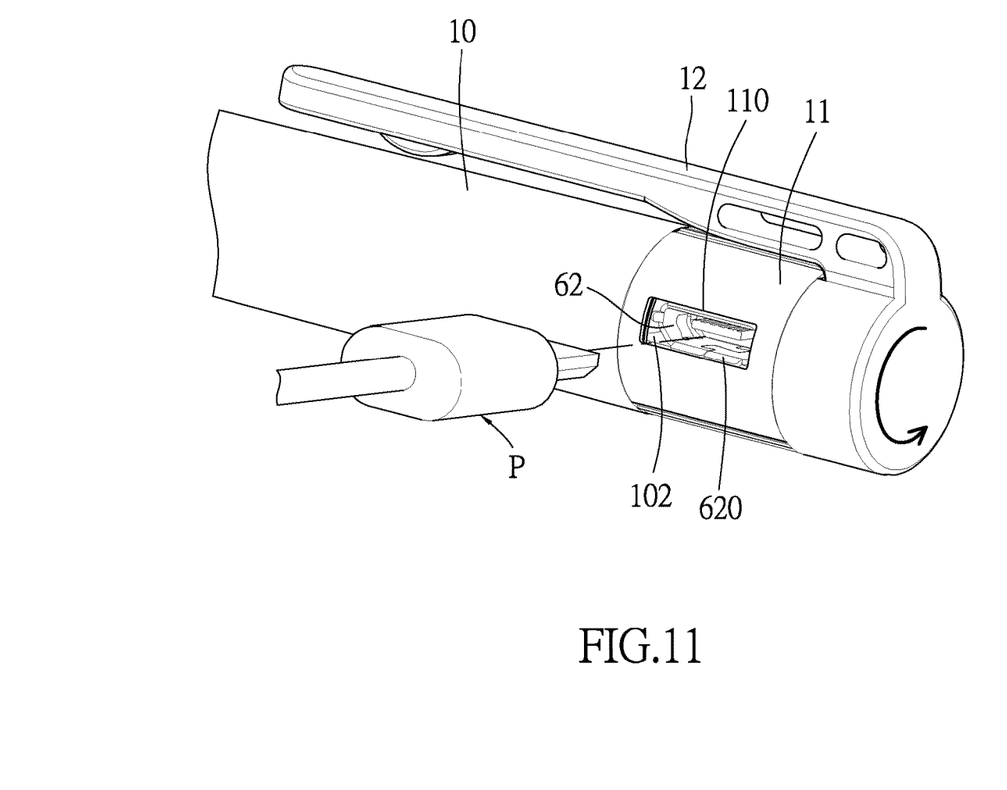
FIG. 11 shows a partial, perspective, schematic view of exposing the second electrical connection portion from the second fixed opening and the movable opening to prepare to electrically mate with an electrical connection head according to the instant disclosure.
Figure 12:
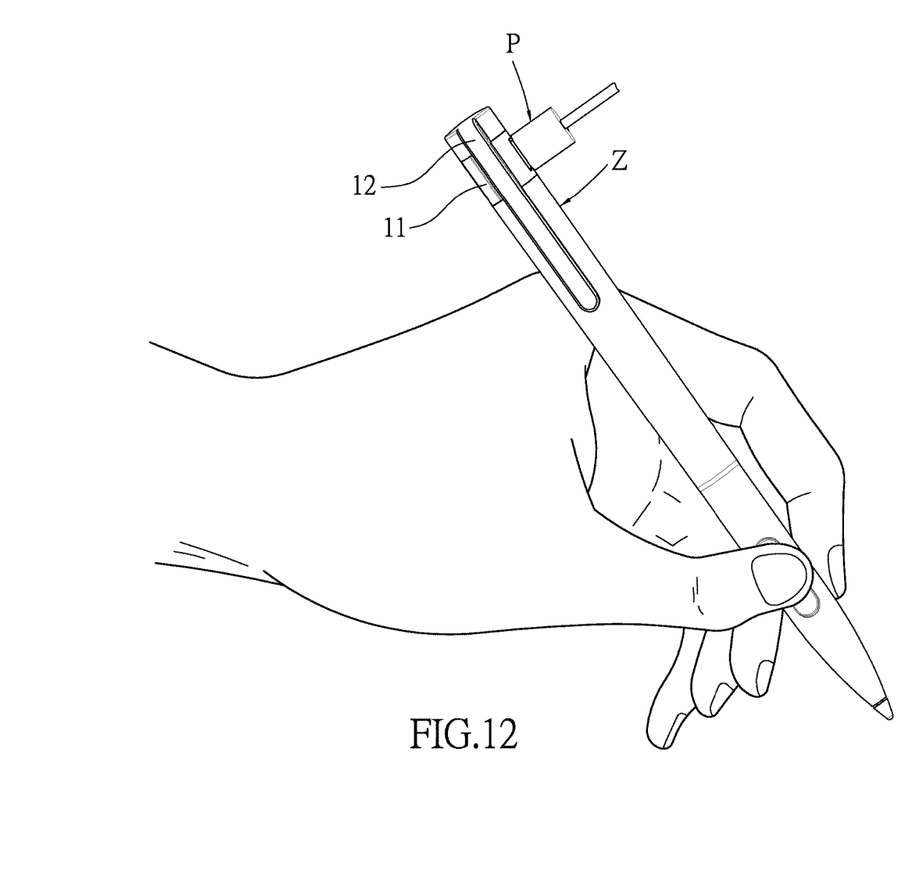
FIG. 12 shows a partial, perspective, schematic view of exposing the second electrical connection portion from the second fixed opening and the movable opening to electrically mate with an electrical connection head according to the instant disclosure.

For example, referring to FIG. 7, FIG. 10, and FIG. 12, when the rotatable ring 11 is rotated anti-clockwise relative to the pen casing 10 or the pen holder 12 to align the movable opening 110 with the second fixed opening 102 (as shown in FIG. 11), the first fixed opening 101 of the pen casing 10 is covered by the rotatable ring 11 (as shown in FIG. 7), and the second electrical connection portion 620 of the second electrical connector 62 (such as a female connector) is exposed from the second fixed opening 102 and the movable opening 110 to electrically mate with an electrical connection head P (such as a male connector), in order to charge up the power supply component 7 of the rechargeable capacitive stylus Z. As shown in FIG. 12, the rechargeable capacitive stylus Z can be used by a left handedness during the charging process.

In conclusion, when the rotatable ring 11 is rotated relative to the pen casing 10 or the pen holder 12 to move the movable opening 110 to a position under the pen holder 12, the first fixed opening 101 of the pen casing 10 is covered by the rotatable ring 11, and the movable opening 110 of the rotatable ring 11 is shaded by the pen holder 12 to enhance the aspect of the rechargeable capacitive stylus Z. Furthermore, when the rotatable ring 11 is rotated relative to the pen casing 10 or the pen holder 12 to align the movable opening 110 with the first fixed opening 101, the first electrical connection portion 610 of the first electrical connector 61 is exposed from the first fixed opening 101 and the movable opening 110 to electrically mate with an electrical connection head P, in order to charge up the power supply component 7 of the rechargeable capacitive stylus Z.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A rechargeable capacitive stylus, comprising:
a pen-shaped casing structure having a pen casing, a rotatable ring rotatably disposed around the pen casing, and a pen holder adjacent to the pen casing and the rotatable ring;
a support structure disposed inside the pen-shaped casing structure;
a circuit substrate positioned on the support structure and disposed inside the pen-shaped casing structure;
a sensor module positioned on the support structure and disposed inside the pen-shaped casing structure;
a pen head structure movably disposed on the support structure to selectively contact the sensor module, wherein the pen head structure has an exposed contact portion exposed from the pen-shaped casing structure;
an electrical connector structure positioned on the support structure and disposed inside the pen-shaped casing structure, wherein the electrical connector structure includes a chargeable carrier substrate positioned on the support structure and a first electrical connector disposed on the chargeable carrier substrate and electrically connected to the chargeable carrier substrate, and the first electrical connector has a first electrical connection portion; and
a power supply component disposed on the support structure and electrically connected between the circuit substrate and the electrical connector structure;
wherein the pen casing has a first fixed opening for exposing the first electrical connection portion of the first electrical connector, and the rotatable ring has a movable opening that is moved relative to the pen casing or the pen holder.

2. The rechargeable capacitive stylus of claim 1, wherein the rotatable ring is rotated relative to the pen casing or the pen holder to move the movable opening to a position under the pen holder, so that the first fixed opening of the pen casing is covered by the rotatable ring, and the movable opening of the rotatable ring is shaded by the pen holder.

3. The rechargeable capacitive stylus of claim 1, wherein the rotatable ring is rotated relative to the pen casing or the pen holder to align the movable opening with the first fixed opening, so that the first electrical connection portion of the first electrical connector is exposed from the first fixed opening and the movable opening to electrically mate with an electrical connection head.

4. The rechargeable capacitive stylus of claim 1, wherein the electrical connector structure includes a second electrical connector disposed on the chargeable carrier substrate and electrically connected to the chargeable carrier substrate, and the second electrical connector has a second electrical connection portion corresponding to the first electrical connection portion, wherein the pen casing has a second fixed opening for exposing the second electrical connection portion of the second electrical connector.

5. The rechargeable capacitive stylus of claim 4, wherein the rotatable ring is rotated relative to the pen casing or the pen holder to move the movable opening to a position under the pen holder, so that the first fixed opening and the second fixed opening of the pen casing is covered by the rotatable ring, and the movable opening of the rotatable ring is shaded by the pen holder.

6. The rechargeable capacitive stylus of claim 4, wherein the rotatable ring is rotated clockwise relative to the pen casing or the pen holder to align the movable opening with the first fixed opening, so that the second fixed opening of the pen casing is covered by the rotatable ring, and the first electrical connection portion of the first electrical connector is exposed from the first fixed opening and the movable opening to electrically mate with an electrical connection head.

7. The rechargeable capacitive stylus of claim 4, wherein the rotatable ring is rotated anti-clockwise relative to the pen casing or the pen holder to align the movable opening with the second fixed opening, so that the first fixed opening of the pen casing is covered by the rotatable ring, and the second electrical connection portion of the second electrical connector is exposed from the second fixed opening and the movable opening to electrically mate with an electrical connection head.

8. The rechargeable capacitive stylus of claim 1, wherein the support structure includes a first support element for supporting the circuit substrate, the sensor module, and the pen head structure and a second support element connected to the first support element for supporting the electrical connector structure and the power supply component, wherein the first support element includes a first support body, a second support body connected to the first support body, a first conductive layer disposed on the first support body, and a second conductive layer connected to the first conductive layer and disposed on the second support body, and one of the first conductive layer and the second conductive layer is electrically connected to a grounding soldering region of the circuit substrate, wherein the chargeable carrier substrate is secured on the second support element, the second support element has a first retaining portion and a second retaining portion, and the chargeable carrier substrate has two adjacent lateral side portions respectively mated with the first retaining portion and the second retaining portion, wherein the sensor module has a sensor component electrically connected to the circuit substrate through a conductive wire, wherein pen casing has a first positioning groove, a second positioning groove, and a sliding track disposed between the first positioning groove and the second positioning groove, and the rotatable ring has a first positioning convex point corresponding to the first positioning groove, a second positioning convex point corresponding to the second positioning groove, and a movable sliding block corresponding to the sliding track.

9. A rechargeable capacitive stylus, comprising:
a pen-shaped casing structure having a pen casing, a rotatable ring rotatably disposed around the pen casing, and a pen holder adjacent to the pen casing and the rotatable ring;
a sensor module disposed inside the pen-shaped casing structure;
a pen head structure movably disposed inside the pen-shaped casing structure to selectively contact the sensor module, wherein the pen head structure has an exposed contact portion exposed from the pen-shaped casing structure; and an electrical connector structure disposed inside the pen-shaped casing structure, wherein the electrical connector structure includes a first electrical connector electrically connected to a power supply, and the first electrical connector has a first electrical connection portion;

wherein the pen casing has a first fixed opening for exposing the first electrical connection portion of the first electrical connector, and the rotatable ring has a movable opening that is moved relative to the pen casing or the pen holder.

10. The rechargeable capacitive stylus of claim 9, wherein the rotatable ring is rotated relative to the pen casing or the pen holder to move the movable opening to a position under the pen holder, so that the first fixed opening of the pen casing is covered by the rotatable ring, and the movable opening of the rotatable ring is shaded by the pen holder.

11. The rechargeable capacitive stylus of claim 9, wherein the rotatable ring is rotated relative to the pen casing or the pen holder to align the movable opening with the first fixed opening, so that the first electrical connection portion of the first electrical connector is exposed from the first fixed opening and the movable opening to electrically mate with an electrical connection head.

12. The rechargeable capacitive stylus of claim 9, wherein the electrical connector structure includes a second electrical connector electrically connected to the power supply, and the second electrical connector has a second electrical connection portion corresponding to the first electrical connection portion, wherein the pen casing has a second fixed opening for exposing the second electrical connection portion of the second electrical connector.

13. The rechargeable capacitive stylus of claim 12, wherein the rotatable ring is rotated relative to the pen casing or the pen holder to move the movable opening to a position under the pen holder, so that the first fixed opening and the second fixed opening of the pen casing is covered by the rotatable ring, and the movable opening of the rotatable ring is shaded by the pen holder.

14. The rechargeable capacitive stylus of claim 12, wherein the rotatable ring is rotated clockwise relative to the pen casing or the pen holder to align the movable opening with the first fixed opening, so that the second fixed opening of the pen casing is covered by the rotatable ring, and the first electrical connection portion of the first electrical connector is exposed from the first fixed opening and the movable opening to electrically mate with an electrical connection head.

15. The rechargeable capacitive stylus of claim 12, wherein the rotatable ring is rotated anti-clockwise relative to the pen casing or the pen holder to align the movable opening with the second fixed opening, so that the first fixed opening of the pen casing is covered by the rotatable ring, and the second electrical connection portion of the second electrical connector is exposed from the second fixed opening and the movable opening to electrically mate with an electrical connection head.

* * * * *